United States Patent [19]

Munih

[11] Patent Number: 4,469,573

[45] Date of Patent: * Sep. 4, 1984

[54] METHOD AND ARRANGEMENT FOR SEPARATING RUBBER FROM METAL

[75] Inventor: Pavel Munih, Kranj, Yugoslavia

[73] Assignee: Sava Kranj Industrija gumijevih, usnjenih in kemicnih izdelkov n.l.sol.o., Ljubljana, Yugoslavia

[*] Notice: The portion of the term of this patent subsequent to Jun. 1, 1989 has been disclaimed.

[21] Appl. No.: 362,773

[22] Filed: Mar. 29, 1982

Related U.S. Application Data

[63] Continuation-in-part of Ser. No. 199,157, Oct. 21, 1980, Pat. No. 4,332,700.

[51] Int. Cl.$^3$ ............................ C08J 3/28; C08J 11/00
[52] U.S. Cl. ....................................... 204/155; 209/11; 209/636; 521/41
[58] Field of Search ............................ 521/41; 204/155; 209/11, 636

[56] References Cited

U.S. PATENT DOCUMENTS

| | | | |
|---|---|---|---|
| 2,223,362 | 12/1940 | Federman. | |
| 2,291,862 | 8/1942 | Bailey | 219/13 |
| 2,406,458 | 8/1946 | Gerndt et al. | 260/720 |
| 2,468,472 | 4/1949 | Townsend | 209/11 |
| 2,636,408 | 4/1953 | Mitchell | 81/9.51 |
| 2,783,213 | 2/1957 | Beau | 521/45 |
| 2,800,462 | 7/1957 | Sverdrup | 521/45.5 |
| 3,097,160 | 7/1963 | Rich | 209/11 |
| 3,704,108 | 11/1972 | Alpert | 521/44.5 |
| 3,725,314 | 4/1973 | Pelofsky | 264/23 |
| 3,938,266 | 2/1976 | Cook | 36/19.5 |
| 3,963,417 | 6/1976 | Placek | 432/225 |
| 3,976,563 | 8/1976 | Scalco | 209/3 |
| 4,055,616 | 10/1977 | Keen et al. | 264/139 |
| 4,104,205 | 8/1978 | Novotny et al. | 264/26 |
| 4,148,702 | 4/1979 | Lane | 204/159.12 |

FOREIGN PATENT DOCUMENTS

| | | |
|---|---|---|
| 2900655 | 7/1980 | Fed. Rep. of Germany. |
| 577830 | 6/1946 | United Kingdom. |
| 591995 | 9/1947 | United Kingdom. |

Primary Examiner—Wilbert J. Briggs, Sr.
Attorney, Agent, or Firm—Pollock, Vande Sande & Priddy

[57] ABSTRACT

A method of separating rubber from metal, which includes obtaining a metal-containing rubber body, impeding the access of oxygen to the rubber, exposing the body to high-frequency electromagnetic field to cause the metal to glow and the border layer of the rubber on the metal-rubber contact to be thermally degraded and carbonized, and magnetically separating the rubber from the metal, and apparatus for carrying out the method.

13 Claims, 1 Drawing Figure

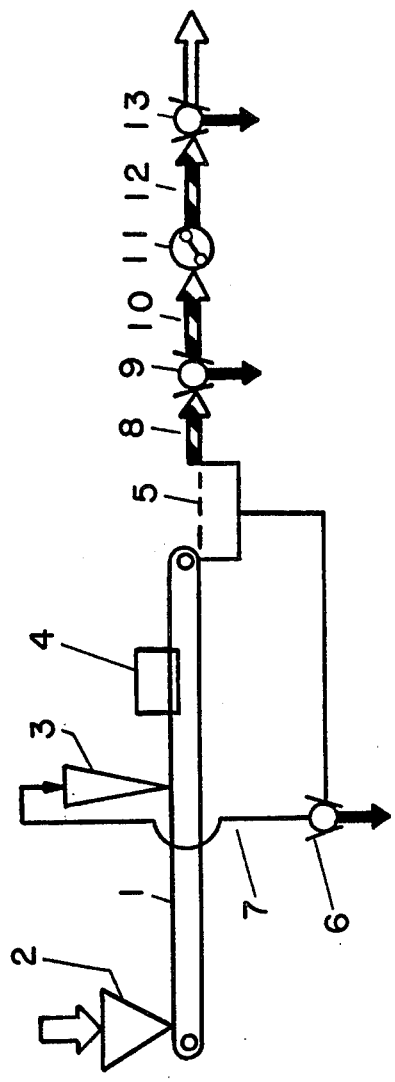

METHOD AND ARRANGEMENT FOR SEPARATING RUBBER FROM METAL

CROSS-REFERENCE TO RELATED APPLICATION

This is a continuation-in-part of my pending U.S. patent application Ser. No. 199,157 filed Oct. 21, 1980, now U.S. Pat. No. 4,332,700, and entitled "Method and Arrangement for Separating Rubber From Metal, Especially in the Processing of Waste Tires".

DESCRIPTION

1. Technical Field

The present invention relates to a method for separating rubber from compositions thereof with metal as well as to an arrangement for carrying out the method. This invention is preferably concerned with the processing of old and waste tires respectively comprising metal cord as a reinforcing ply incorporated in the tire.

2. Background Art

The disposal of waste tires and similar rubber-metal combinations have for a long time represented problems from the standpoint of economy as well as environment protection.

Therefore, it has been attempted to separate said components by a simple and efficient manner without impairing either the metal or the rubber in order to make possible their reuse.

Heretofore, this problem has been solved in two ways:

(1) By shredding, chopping, grinding, or any other disintegration of the material and the separation thereof, e.g. by means of sifting. This yields a relatively low percentage (60%) of the pure rubber fraction, the remaining fraction being, owing to the relatively high content of bound rubber, unsuitable as secondary raw-material. The maintenance and energy costs are high.

An improvement of this method is suggested in DT-OS No. 26 07 945, wherein the raw-materials, especially old or waste tires respectively, are separated in a preheated state, for example, at a temperature of at least 100° C. Thus, the strength of the metal-rubber bond is reduced to about one-third of the initial value, which results in a reduced energy consumption during separation.

However, even this method does not solve the problem satisfactorily since the separation is not complete and a part of the rubber remains bonded to the metal.

(2) By means of a severe undercooling of the raw-material, thereby converting the rubber into a brittle, glassy state, followed by the grinding and separating of the components. This method is too expensive for practical use since it required 1 kg. of liquid nitrogen as cooling medium per 1 kg. of rubber. Furthermore, a substantial part of the rubber remains bonded to the metal. For this reason the latter is not suitable as a pure secondary raw-material.

SUMMARY OF INVENTION

By means of the present method and the arrangement for carrying out the method, there is achieved in a simple and economical way a practically complete separation of the components which are therefore suitable as secondary raw-materials.

The inventive method of the present invention is characterized in that a suitably disintegrated raw-material is obtained, the access of oxygen to the rubber is impeded and the disintegrated raw-material is exposed to the action of a high-frequency electromagnetic field 500 Hz–10 MHz, preferably about 450 KHz, whereby the metal is heated inductively till glowing. This results in the thermic degradation of the rubber on the rubber-metal border area and in the breaking of the rubber-metal bond. The rubber is completely released from the metal and the thermally degraded surface layer bordering on the metal is carbonized due to the lack of oxygen. Since the access of oxygen to the rubber is impeded, the risk of ignition is minimized. The mixture is cooled until the glowing of the metal ceases. The rubber-metal mixture is divided into the two components by means of magnetic separation.

SUMMARY OF DRAWING

The FIGURE illustrates an arrangement suitable for carrying out the process of the present invention.

BEST AND VARIOUS MODES FOR CARRYING OUT INVENTION

In accordance with the present invention, rubber is separated from metal in a disintegrated metal-containing rubber body by impeding the access of oxygen to the rubber. The access of oxygen to the rubber can be impeded such as by providing an atmosphere substantially, if not entirely, free from oxygen over the rubber, such as a nitrogen atmosphere; covering the metal-containing rubber body with an inert powdered agent or, preferably, covering the metal-containing rubber body with a cover.

Examples of powdered agents suitable for use in the present invention include talc and non-flammable filler materials used in the rubber industry such as calcium carbonates, such as calcite; clays, such as kaolin clay; and silica. Mixtures can be used, if desired. Usually the powdered agents have a particle size of about 10 microns or less. The preferred powdered agent is talc.

As stated above, the preferred method of impeding the access of oxygen is providing a cover over the disintegrated metal-containing rubber body. The cover body may be rigid or preferably made of a flexible, non-metallic, non-flammable, and fireproof or fire-resistant material such as fiberglass fabric including those impregnated with a polymer such as a silicone polymer or polymers of halogenated olefins such as polytetrafluoroethylene and fluorinated ethylene-propylane resins. Polymers of halogenated olefins are commercially available from DuPont under the trade designation Teflon.

The thickness of the cover can vary over a wide range, but usually, primarily for practical considerations such is no greater than about 10 mm. (when rigid) and preferably no greater than about 5 mm. (when flexible).

The risk of ignition is minimized since the access of oxygen to the rubber is impeded. The mixture is cooled until the glowing of the metal ceases. When an inert agent is employed such can be removed, such as by sifting, after cooling. Also, if desired, the inert agent can be recycled and reused.

The rubber-metal mixture is divided into two components by means of magnetic separation. In the event some metal residue adheres mechanically to the rubber, such is mechanically disjoined and recharged to the magnetic separator. The gaseous products resulting from the thermic decompostion of the rubber on the surface of the glowing metal are drawn off and purified in known ways.

Since the rubber and other non-metallic components (e.g. textile fabric in the tires) are comparatively non-sensitive to the HF-field, the energy consumption is nominal, or depending respectively on the quantity of the metal which absorbs this energy and is heated thereby.

The FIGURE illustrates an arrangement of separating rubber from metal suitable for carrying out the process of the present invention. The arrangement includes a conveyer 1. At the beginning of the conveyer is positioned an appliance or hopper 2 for receiving roughly shredded parts of the raw-material, e.g. tires. In the direction of movement of the conveyer 1 there follows a device 3 which coats, preferably by strewing, an inert powdered agent, e.g. talc, over the roughly shredded parts of raw-material. The conveyer 1 then passes an induction loop 4 connected to a high-frequency generator (not shown). In the area of this loop 4, the inductive heating of the metal parts forming the reinforcement of the tire is carried out.

When a cover is to be employed, such is fixed or attached, adjacent to the border of conveyer belt 1. The cover is located between the induction loop and conveyor belt 1 for the material to be treated. Preferably, the cover overlays the raw-material in a relatively airtight position. It is not necessary that the cover be absolutely air-tight since an over-pressure is generated under the cover due to the gas-forming reactions during the carbonization.

At the exit of the conveyer 1 is positioned a screen-like means 5 onto which the conveyer 1 deposits the already partly cooled separated components, (i.e. parts of rubber and metal) mixed with the inert powdered agent, if used. On the screen-like means 5, which is brought into vibration movement by a driving supply (not shown), small metal parts and decomposed rubber products, especially soot, together with the inert powdered agent, when used, are separated and then fed to the first magnetic separator 6 where these components are divided. Here, the inert powdered agent is fed to the device 3 via feeding means 7 for a repeated usage.

The remaining larger parts of the metal and rubber are fed to a second magnetic separator 9 over another conveyor 8. Here, these metal parts are separated from the rubber parts which, at this point, are not adhesively jointed to said rubber parts. From the separator 9 another conveyor 10 leads forward, transporting all rubber parts into the disintegrator 11. In particular, the parts which still have mechanically bound metal remaining and also those rubber parts from which the metal has already fallen apart and has been eliminated in the separator 9. In disintegrator 11 the remaining adhesion between the metal and the rubber is destroyed. The components are fed by conveyer 12 to magnetic separator 13, where the final step of separating rubber from metal is carried out.

It is to be understood that outputs of all magnetic separators 6, 9, and 13 are interconnected so that all metal is collected at one place. It is also understood that the whole device is united into one unit which may also contain additional supervision and control units, which are not essential to this invention. These are primarily units for automatic matching of the speed of the conveyer 1 to the properties of the raw-material as well as devices for automatic signalling and extinguishing of an eventually arising fire.

What is claimed is:

1. A method for separating rubber from metal which comprises obtaining a disintegrated metal-containing rubber body, impeding the access of oxygen to the rubber, exposing said rubber body to high-frequency electromagnetic field for a time sufficient to cause the metal to glow and the border layer of the rubber on the metal-rubber contact to become thermally degraded and carbonized, cooling until the metal ceases to glow, and separating the rubber from the metal by means of magnetic separation.

2. The method of claim 1 wherein the access of oxygen to the rubber is impeded by covering the rubber with a cover.

3. The method of claim 2 wherein said cover is made of rigid or flexible, non-metallic, non-flammable and fire-resistant material.

4. The method of claim 2 wherein said flexible cover material is fiberglass fabric impregnated with a silicone polymer or a polymer of a halogenated olefin.

5. The method of claim 4 wherein said polymer of halogenated olefin is polytetrafluoroethylene or a fluorinated ethylene-propylene copolymer.

6. The method of claim 1 wherein the access of oxygen to the rubber is impeded by covering the rubber body with an inert powdered agent having a particle size of about 10 microns or less.

7. The method of claim 6 wherein said powdered agent is selected from the group of calcium carbonate, clay, silica, talc, and mixtures thereof.

8. The method of claim 6 wherein said powdered agent is talc.

9. The method of claim 1 wherein said metal-containing rubber body is shredded waste tire.

10. The method of claim 6, 7, or 8 wherein said agent is recycled.

11. The method of claim 6, 7, or 8 wherein the powdered agent is removed by sifting.

12. The method of claim 10 wherein the agent is removed by sifting.

13. The method of claim 9 wherein said waste tire contains metal cord as reinforcing ply.

* * * * *